US012591990B2

(12) United States Patent
Xie et al.

(10) Patent No.: US 12,591,990 B2
(45) Date of Patent: Mar. 31, 2026

(54) METHOD AND APPARATUS FOR GENERATING SPATIAL GEOMETRIC INFORMATION ESTIMATION MODEL

(71) Applicant: Beijing Horizon Information Technology Co., Ltd., Beijing (CN)

(72) Inventors: Jiafeng Xie, Beijing (CN); Wei Sui, Beijing (CN); Teng Chen, Beijing (CN); Qian Zhang, Beijing (CN)

(73) Assignee: Beijing Horizon Information Technology Co., Ltd., Beijing (CN)

( * ) Notice: Subject to any disclaimer, the term of this patent is extended or adjusted under 35 U.S.C. 154(b) by 734 days.

(21) Appl. No.: 17/995,033

(22) PCT Filed: Mar. 22, 2022

(86) PCT No.: PCT/CN2022/082247
§ 371 (c)(1),
(2) Date: Sep. 29, 2022

(87) PCT Pub. No.: WO2022/247414
PCT Pub. Date: Dec. 1, 2022

(65) Prior Publication Data
US 2024/0257377 A1 Aug. 1, 2024

(30) Foreign Application Priority Data
Mar. 26, 2021 (CN) .......................... 202110576312.7

(51) Int. Cl.
*G06T 7/60* (2017.01)
*G06T 7/80* (2017.01)
(Continued)

(52) U.S. Cl.
CPC .................. *G06T 7/60* (2013.01); *G06T 7/80* (2017.01); *G06T 17/00* (2013.01); *G06V 10/44* (2022.01);
(Continued)

(58) Field of Classification Search
CPC . G06T 7/60; G06T 17/00; G06T 2207/30248; G06T 2207/30252; G06T 2207/30256; G01S 17/86; G06V 20/588
See application file for complete search history.

(56) References Cited

U.S. PATENT DOCUMENTS

| | | | |
|---|---|---|---|
| 11,361,457 B2 * | 6/2022 | Shen | ....................... G01S 17/86 |
| 2019/0130216 A1 | 5/2019 | Tomioka et al. | |

(Continued)

FOREIGN PATENT DOCUMENTS

| | | |
|---|---|---|
| CN | 109141364 A | 1/2019 |
| CN | 110363058 A | 10/2019 |

(Continued)

OTHER PUBLICATIONS

International Search Report and Written Opinion for International PCT Application No. PCT/CN2022/082247, dated Jun. 2, 2022.
(Continued)

*Primary Examiner* — Gandhi Thirugnanam
*Assistant Examiner* — Wayne Zhang
(74) *Attorney, Agent, or Firm* — K&L Gates LLP

(57) ABSTRACT

Disclosed in embodiments of the present disclosure are a method and an apparatus for generating a spatial geometric information estimation model, a computer-readable storage medium, and an electronic device. The method includes: acquiring point cloud data collected for a preset scene and a scene image captured for the preset scene; determining coordinates corresponding to the point cloud data in a camera coordinate system corresponding to the scene image; determining, based on the coordinates, annotation spatial geometric information of a target pixel in the scene image corresponding to the point cloud data; and training an initial model by using the scene image as an input of a preset initial model and the annotation spatial geometric information of
(Continued)

Acquire point cloud data collected for a preset scene and a scene image captured for the preset scene — 201

Determine coordinates corresponding to the point cloud data in a camera coordinate system corresponding to the scene image — 202

Determine, based on the coordinates, annotation spatial geometric information of a target pixel in the scene image corresponding to the point cloud data — 203

Train an initial model by using the scene image as an input of a preset initial model and the annotation spatial geometric information of the target pixel as an expected output of the initial model, to obtain a spatial geometric information estimation model — 204 the target pixel as an expected output of the initial model, to obtain a spatial geometric information estimation model.

14 Claims, 7 Drawing Sheets

(51) Int. Cl.

| | | |
|---|---|---|
| *G06T 17/00* | (2006.01) | |
| *G06V 10/44* | (2022.01) | |
| *G06V 10/80* | (2022.01) | |
| *G06V 20/70* | (2022.01) | |

(52) U.S. Cl.
CPC ............ *G06V 10/806* (2022.01); *G06V 20/70* (2022.01); *G06T 2207/20081* (2013.01)

(56) References Cited

U.S. PATENT DOCUMENTS

| | | | | |
|---|---|---|---|---|
| 2019/0354811 A1* | 11/2019 | Hu | ......................... | H04N 19/30 |
| 2020/0193157 A1* | 6/2020 | Soni | .................... | G06F 18/2163 |
| 2020/0327410 A1* | 10/2020 | Fairhart | .................. | G06N 3/08 |
| 2020/0364518 A1* | 11/2020 | Xu | ........................... | G06N 3/08 |

FOREIGN PATENT DOCUMENTS

| | | | | | |
|---|---|---|---|---|---|
| CN | 110893617 A | * | 3/2020 | .............. | G06T 7/66 |
| CN | 111108507 A | | 5/2020 | | |
| CN | 111179300 A | | 5/2020 | | |
| CN | 111386550 A | | 7/2020 | | |
| CN | 111444768 A | | 7/2020 | | |
| CN | 111753739 A | | 10/2020 | | |
| CN | 113269820 A | | 8/2021 | | |
| JP | 2019087229 A | | 6/2019 | | |
| WO | 2020242170 A1 | | 12/2020 | | |

OTHER PUBLICATIONS

First Chinese Office Action and its Search Report from the corresponding Chinese Patent Application No. 202110576312.7, mailed on Dec. 12, 2023 (English translation enclosed).

First Office Action from the corresponding Japanese Patent Application No. 2022-558507, mailed on Aug. 29, 2023 (English translation enclosed).

Shijie et al., "Automatic extrinsic calibration for RGB-D camera based on ground plane detection in point cloud" Journal of Image and Graphics , 2018 , 23( 6) : 0866-0873.

* cited by examiner

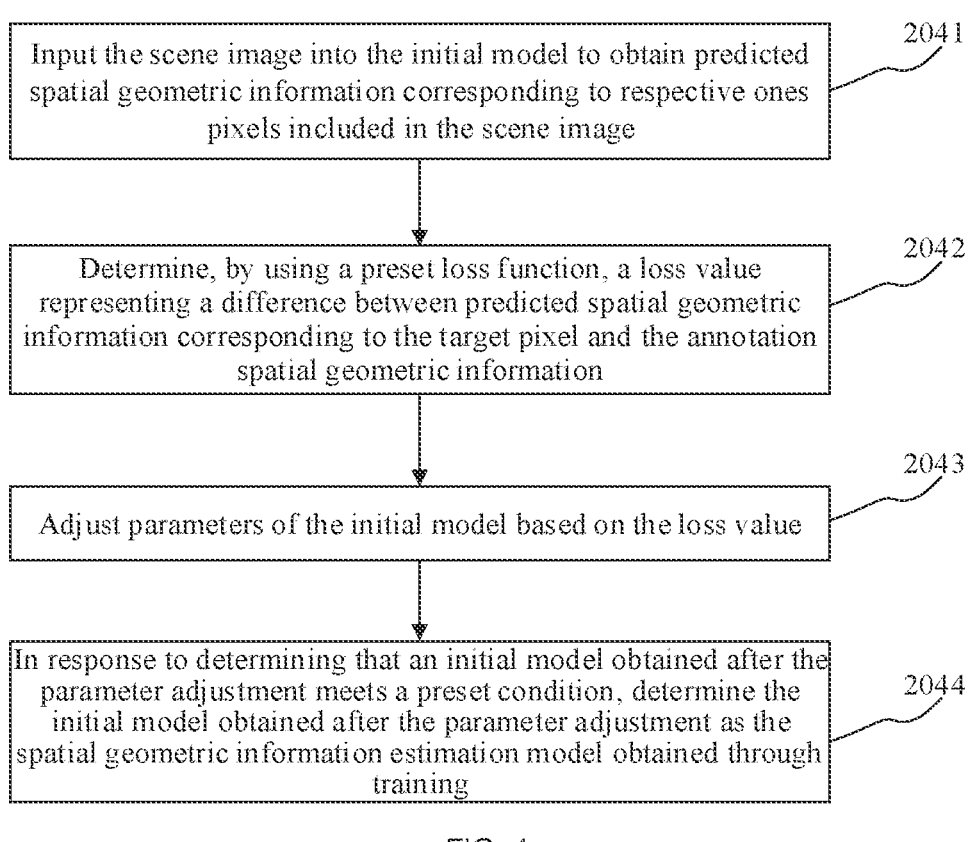

Input the scene image into the initial model to obtain predicted spatial geometric information corresponding to respective ones pixels included in the scene image    2041

Determine, by using a preset loss function, a loss value representing a difference between predicted spatial geometric information corresponding to the target pixel and the annotation spatial geometric information    2042

Adjust parameters of the initial model based on the loss value    2043

In response to determining that an initial model obtained after the parameter adjustment meets a preset condition, determine the initial model obtained after the parameter adjustment as the spatial geometric information estimation model obtained through training    2044

FIG. 4

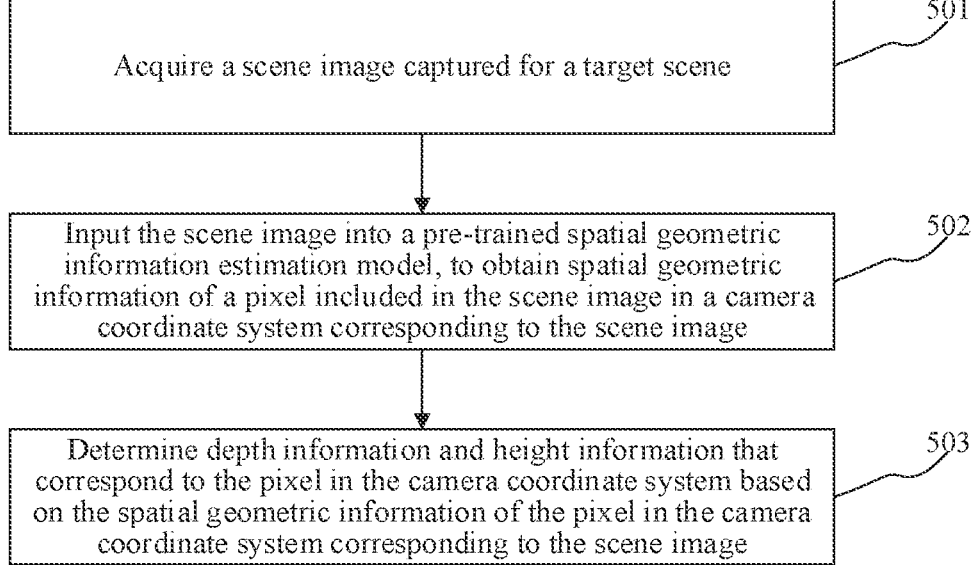

Acquire a scene image captured for a target scene    501

Input the scene image into a pre-trained spatial geometric information estimation model, to obtain spatial geometric information of a pixel included in the scene image in a camera coordinate system corresponding to the scene image    502

Determine depth information and height information that correspond to the pixel in the camera coordinate system based on the spatial geometric information of the pixel in the camera coordinate system corresponding to the scene image    503

FIG. 5

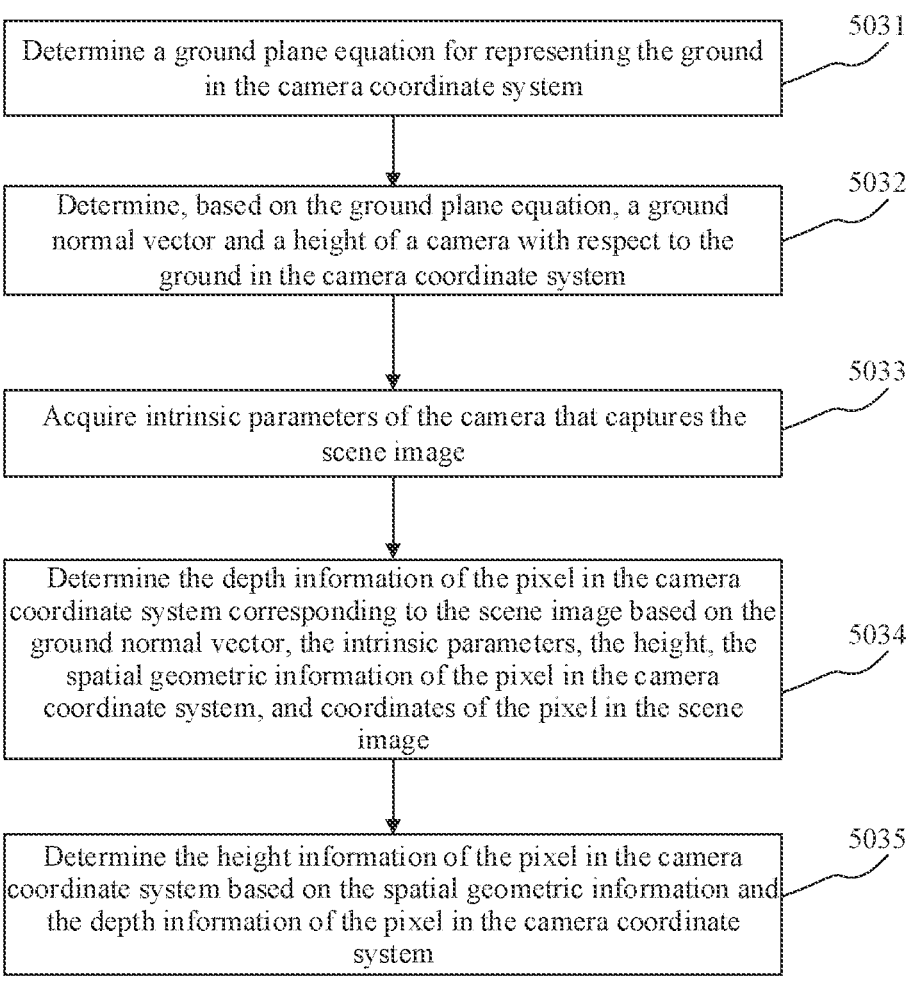

Determine a ground plane equation for representing the ground in the camera coordinate system — 5031

Determine, based on the ground plane equation, a ground normal vector and a height of a camera with respect to the ground in the camera coordinate system — 5032

Acquire intrinsic parameters of the camera that captures the scene image — 5033

Determine the depth information of the pixel in the camera coordinate system corresponding to the scene image based on the ground normal vector, the intrinsic parameters, the height, the spatial geometric information of the pixel in the camera coordinate system, and coordinates of the pixel in the scene image — 5034

Determine the height information of the pixel in the camera coordinate system based on the spatial geometric information and the depth information of the pixel in the camera coordinate system — 5035

FIG. 6

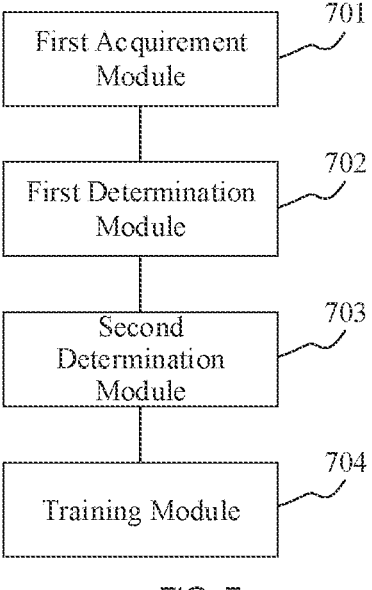

First Acquirement Module — 701

First Determination Module — 702

Second Determination Module — 703

Training Module — 704

FIG. 7

METHOD AND APPARATUS FOR GENERATING SPATIAL GEOMETRIC INFORMATION ESTIMATION MODEL

CROSS-REFERENCE TO RELATED APPLICATIONS

This application is a U.S. National Stage Entry under 35U.S.C. § 371 of International Patent Application No. PCT/CN2022/082247, entitled METHOD AND APPARA-TUS FOR GENERATING SPATIAL GEOMETRIC INFORMATION ESTIMATION MODEL, filed Mar. 22, 2022, which claims priority to and the benefit of Chinese Patent Application No. 202110576312.7, entitled METHOD AND APPARATUS FOR GENERATING SPATIAL GEO-METRIC INFORMATION ESTIMATION MODEL, filed with the China National Intellectual Property Administration on May 26, 2021, the entire disclosures of which are incorporated by reference in their entirety herein.

TECHNICAL FIELD

The present disclosure relates to the field of computer technologies, and in particular, to a method and an apparatus for generating a spatial geometric information estimation model, a spatial geometric information estimating method and apparatus, a computer-readable storage medium, and an electronic device.

BACKGROUND

Road plane disparity estimation is a technology used in assisted driving and automated driving scenarios to help vehicles perceive three-dimensional (3D) information of road surfaces. In assisted driving and automated driving applications, road plane disparity estimation may acquire 3D perception information of a road surface (the 3D perception information includes a height and a depth of an object on the road surface) based on a single frame of image or adjacent two frames of images provided by a camera and with reference to 3D geometric information. At present, for acquiring 3D perception information of a road surface, there are mainly two methods as follows:

1. converting depth information into a 3D point cloud through depth estimation and pre-calibrated ground plane equation information, and restoring 3D percep-tion information of a road surface (the 3D perception information includes depth and height information of an object on the road surface) through a ground plane equation and a formula of the point cloud; and
2. acquiring disparity gamma (a ratio of a depth to a height) through a ground plane equation of a monocular multi-frame image sequence and interframe pose coupled information, and then resolving gamma based on ground plane equation information to obtain 3D perception information of a depth and a height of an object in an image.

SUMMARY

Embodiments of the present disclosure provide a method and an apparatus for generating a spatial geometric infor-mation estimation model, a spatial geometric information estimating method and apparatus, a computer-readable stor-age medium, and an electronic device.

The embodiments of the present disclosure provide a method for generating a spatial geometric information estimation model, the method including: acquiring point cloud data collected for a preset scene and a scene image captured for the preset scene; determining coordinates corresponding to the point cloud data in a camera coordinate system corresponding to the scene image; determining, based on the coordinates, annotation spatial geometric information of a target pixel in the scene image corresponding to the point cloud data; and training an initial model by using the scene image as an input of a preset initial model and the annotation spatial geometric information of the target pixel as an expected output of the initial model, to obtain a spatial geometric information estimation model.

According to another aspect of the embodiments of the present disclosure, a spatial geometric information estimat-ing method is provided, the method including: acquiring a scene image captured for a target scene; inputting the scene image into a pre-trained spatial geometric information esti-mation model, to obtain spatial geometric information of a pixel included in the scene image in a camera coordinate system corresponding to the scene image, where the spatial geometric information estimation model is obtained based on the method for generating a spatial geometric information estimation model according to the first aspect of the embodi-ments of the present disclosure; and determining depth information and height information that correspond to the pixel in the camera coordinate system based on the spatial geometric information of the pixel in the camera coordinate system corresponding to the scene image.

According to another aspect of the embodiments of the present disclosure, an apparatus for generating a spatial geometric information estimation model is provided, the apparatus including: a first acquirement module, configured to acquire point cloud data collected for a preset scene and a scene image captured for the preset scene; a first deter-mination module, configured to determine coordinates cor-responding to the point cloud data in a camera coordinate system corresponding to the scene image; a second deter-mination module, configured to determine, based on the coordinates, annotation spatial geometric information of a target pixel corresponding to the point cloud data in the scene image; and a training module, configured to train an initial model by using the scene image as an input of a preset initial model and the annotation spatial geometric informa-tion of the target pixel as an expected output of the initial model, to obtain a spatial geometric information estimation model.

According to another aspect of the embodiments of the present disclosure, a spatial geometric information estimat-ing apparatus is provided, the apparatus including: a second acquirement module, configured to acquire a scene image captured for a target scene; an estimation module, config-ured to input the scene image into a pre-trained spatial geometric information estimation model, to obtain spatial geometric information of a pixel included in the scene image in a camera coordinate system corresponding to the scene image, where the spatial geometric information estimation model is obtained based on the method for generating a spatial geometric information estimation model according to the first aspect of the embodiments of the present disclosure; and a third determination module, configured to determine depth information and height information that correspond to the pixel in the camera coordinate system based on the spatial geometric information of the pixel in the camera coordinate system corresponding to the scene image.

According to another aspect of the embodiments of the present disclosure, a computer-readable storage medium is provided, where the computer-readable storage medium stores a computer program, and the computer program is used for performing the foregoing method for generating a spatial geometric information estimation model or the foregoing spatial geometric information estimating method.

According to another aspect of the embodiments of the present disclosure, an electronic device is provided, the electronic device including: a processor; and a memory, configured to store instructions executable by the processor, where the processor is configured to read the executable instructions from the memory and execute the instructions to implement the foregoing method for generating a spatial geometric information estimation model or the foregoing spatial geometric information estimating method.

Based on the method and apparatus for generating a spatial geometric information estimation model, the spatial geometric information estimating method and apparatus, the computer-readable storage medium, and the electronic device provided in the embodiments of the present disclosure, point cloud data collected for a preset scene and a scene image captured for the preset scene are acquired, then coordinates corresponding to the point cloud data in a camera coordinate system are determined, then annotation spatial geometric information corresponding to the point cloud data is determined in the scene image based on the obtained coordinates, and finally, a spatial geometric information estimation model is obtained through training by using the scene image used as an input and the annotation spatial geometric information as an expected output. This allows model training to be implemented by using a single frame of image, and makes it easier to obtain a training sample. Furthermore, 3D space states of various objects included in the preset scene may be accurately represented by annotation spatial geometric information used during training, and thus it may be possible to effectively improve calculation accuracy of the spatial geometric information estimation model obtained through training. During spatial geometric information estimation, by the input of only the single frame of image into the spatial geometric information estimation model, the spatial geometric information estimation model may output spatial geometric information corresponding to a pixel in the image, without analyzing a correlation among a plurality of frames of images, thereby improving efficiency of the spatial geometric information estimation. Meanwhile, estimated spatial geometric information is used to restore depth information and height information of various objects in the target scene, so that there is no need to perform an interframe pose operation on the objects, reducing demands for computing resources, in spite of a motion status of a detected object, thereby improving efficiency of acquiring 3D perception information in the target scene, and extending applicable scenarios of determining 3D perception information.

The technical solutions of the present disclosure are further described in detail below through accompanying drawings and embodiments.

BRIEF DESCRIPTION OF DRAWINGS

The foregoing and other objectives, features, and advantages of the present disclosure will become more apparent from the more detailed description of the embodiments of the present disclosure with reference to the accompanying drawings. The accompanying drawings are used for a further understanding of the embodiments of the present disclosure, constitute a part of this specification, are used together with the embodiments of the present disclosure to explain the present disclosure, and do not constitute a limitation to the present disclosure. In the accompanying drawings, same reference signs typically represent same components or steps.

FIG. 4 is a schematic flowchart of a method for generating a spatial geometric information estimation model according to another exemplary embodiment of the present disclosure.

FIG. 5 is a schematic flowchart of a spatial geometric information estimating method according to an exemplary embodiment of the present disclosure.

FIG. 6 is a schematic flowchart of a spatial geometric information estimating method according to another exemplary embodiment of the present disclosure.

FIG. 7 is a schematic structural diagram of an apparatus for generating a spatial geometric information estimation model according to an exemplary embodiment of the present disclosure.

DETAILED DESCRIPTION OF THE EMBODIMENTS

Figure 1:
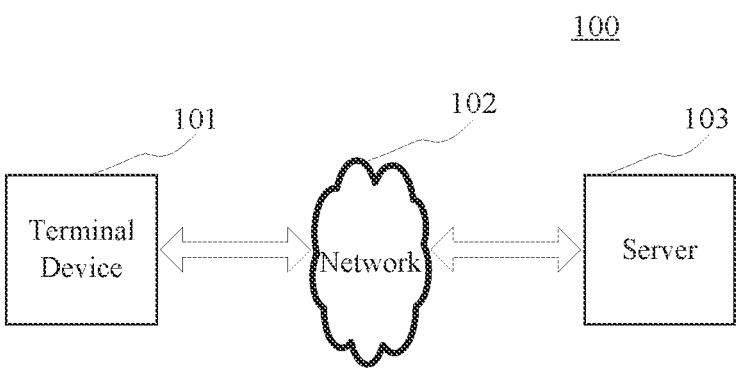
FIG. 1 is a diagram of a system to which the present disclosure is applicable.

Exemplary embodiments according to the present disclosure are described in detail below with reference to the accompanying drawings. Apparently, the described embodiments are merely some of embodiments of the present disclosure, rather than all of the embodiments of the present disclosure. It should be understood that, the present disclosure is not limited by the exemplary embodiments described herein.

It should be noted that: the relative arrangement of components and steps, numerical expressions, and numerical values set forth in these embodiments do not limit the scope of the present disclosure, unless otherwise specifically stated.

Those skilled in the art may understand that, terms such as "first" and "second" in the embodiments of the present disclosure are used only to distinguish between different steps, devices, modules, or the like, and represent neither any specific technical meaning, nor any necessary logical sequence between them.

It should be further understood that, in the embodiments of the present disclosure, "plurality of" may refer to two or more, and "at least one" may refer to one, two, or more.

It should be further understood that any singular number expression for component, data, or structure to which the embodiments of the present disclosure refer may be generally understood as including plural expressions, unless clearly expressed otherwise in the context.

In addition, the term "and/or" in the present disclosure describes only an association relationship for describing associated objects and represents presences of three relationships. For example, A and/or B may represent the following three cases: presence of only A, presence of both A and B, and presence of only B. In addition, the character "/" in the present disclosure generally indicates an "or" relationship between the associated objects.

It should be further understood that, the description of the embodiments in the present disclosure highlights differences between the embodiments, and their sameness or similarities may be referred to each other. For brevity, details are not described repeatedly.

In addition, it should be noted that, for ease of description, the accompanying drawings are not necessarily scaled according to actual dimensions of various parts.

The following description of at least one exemplary embodiment is merely illustrative in nature, and is not intended as limiting the present disclosure and its application or use.

Techniques, methods, and devices known to those of ordinary skill in the art may not be discussed in detail, but where appropriate, such techniques, methods, and devices should be considered as part of this specification.

It should be noted that: similar numerals and letters in the following accompanying drawings represent similar items, so that once an item is defined in one accompanying drawing, the item may not be further discussed necessarily in subsequent accompanying drawings.

The embodiments of the present disclosure are applicable to a terminal device, a computer system, a server, or other electronic devices, and may be operated together with numerous other general-purpose or special-purpose computing system environments or configurations. Examples of well-known terminal devices, computing systems, environments, and/or configurations suitable for use together with the terminal device, the computer system, the server, and other electronic devices include, but are not limited to: personal computer systems, server computer systems, thin clients, thick clients, handheld or laptop devices, microprocessor-based systems, set top boxes, programmable consumer electronics, network personal computers, small computer systems, mainframe computer systems, distributed cloud computing technology environments including any of the foregoing systems, or the like.

The terminal device, the computer system, the server, and other electronic devices may be described in the general context of computer system executable instructions (such as program modules) executed by the computer system. Typically, a program module may include a routine, a program, a target program, a component, logic, a data structure, and the like, which perform specific tasks or implement specific abstract data types. The computer system/server may be implemented in a distributed cloud computing environment. In the distributed cloud computing environment, a task is performed by a remote processing device linked through a communication network. In the distributed cloud computing environment, the program module may be located on storage medium including a storage device in a local or remote computing system.

Overview of Application

In a commonly used solution at present, for acquiring of 3D perception information of an object, typically, depth information of pixels in an image including the object is first obtained directly by using a depth estimation model, and then height information of the corresponding pixels is obtained through direct transform of a ground plane equation. In such a method, the height information and the depth information are not coupled together, instead, the depth information is first obtained by using the depth estimation model and then the height information of the pixels is obtained through direct transform of the ground plane equation. Height accuracy obtained in such a manner is reduced.

In another solution, gamma prediction in a method of a monocular multi-frame image sequence is performed based on the absence of self-motion of objects of corresponding pixels. However, this assumption is typically invalid in a driving scene. As a result, the effect of processing moving objects is poor, that is, accuracy of obtained 3D perception information is poor. In addition, in the solution, accurate interframe pose changes need to be obtained before an image is input into a model in a running phase. If a more accurate interframe pose is obtained by multi-sensor fusion, a lot of computing resources need to be consumed and a system delay is increased.

Exemplary System

FIG. 1 illustrates an exemplary system architecture 100 to which a method and an apparatus for generating a spatial geometric information estimation model and a spatial geometric information estimating method and apparatus of the embodiments of the present disclosure may be applied.

As shown in FIG. 1, the system architecture 100 may include a terminal device 101, a network 102, and a server 103. The network 102 is a medium providing a communication link between the terminal device 101 and the server 103. The network 102 may include various connection types, such as wired or wireless communication links or fiber optic cables.

A user may use the terminal device 101 to interact with the server 103 through the network 102 to receive or send a message or the like. Various communication client applications such as photography applications or navigation applications may be installed on the terminal device 101.

The terminal device 101 may be various electronic devices, including but not limited to mobile terminals such as mobile phones, notebook computers, digital broadcast receivers, personal digital assistants (PDAs), portable android devices (PADs), portable multimedia players (PMPs), or in-vehicle terminals (for example, in-vehicle navigation terminals), and fixed terminals such as digital televisions (TVs) or desktop computers.

The server 103 may be a server that provides various services, for example, a background server that uses data uploaded by the terminal device 101 to perform training for a spatial geometric information estimation model. The background server may annotate a received scene image with spatial geometric information, and then perform model training based on the annotation spatial geometric information to obtain the spatial geometric information estimation model. The server 103 may further perform online spatial geometric information estimation by using the trained spatial geometric information estimation model, or feed back the trained spatial geometric information estimation model to the terminal device 101, and the terminal device 101 performs spatial geometric information estimation by using the spatial geometric information estimation model.

It should be noted that, the method for generating a spatial geometric information estimation model and the spatial geometric information estimating method provided in the embodiments of the present disclosure may be performed by the server 103 or may be performed by the terminal device 101. Correspondingly, the apparatus for generating a spatial geometric information estimation model and the spatial geometric information estimating apparatus may be disposed in the server 103 or may be disposed in the terminal device 101.

It should be understood that, numbers of terminal devices, networks, and servers in FIG. 1 are merely illustrative. There may be any numbers of terminal devices, networks, and servers according to implementation needs. When a scene image, point cloud data, or the like does not need to be obtained from remote locations, the system architecture may not include a network, but include only a server or a terminal device.

Exemplary Method

Figure 2:
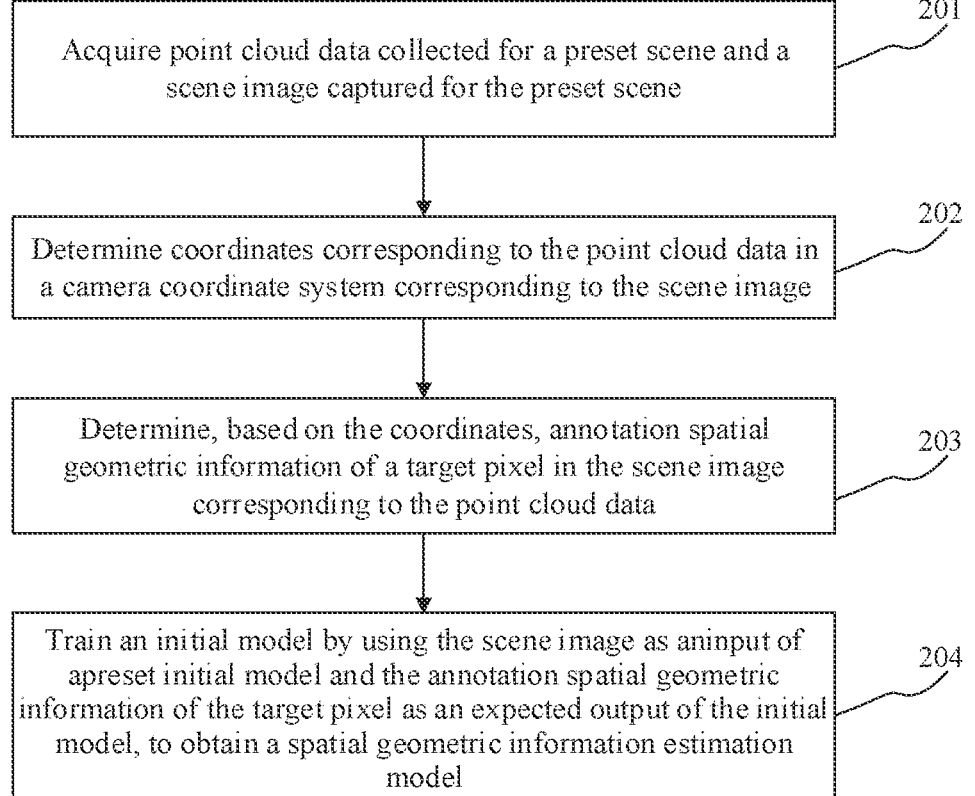
FIG. 2 is a schematic flowchart of a method for generating a spatial geometric information estimation model according to an exemplary embodiment of the present disclosure.

FIG. 2 is a schematic flowchart of a method for generating a spatial geometric information estimation model according to an exemplary embodiment of the present disclosure. This embodiment is applicable to an electronic device (the terminal device 101 or the server 103 shown in FIG. 1). As shown in FIG. 2, the method includes the following steps:

Step 201. Acquire point cloud data collected for a preset scene and a scene image captured for the preset scene.

In this embodiment, the electronic device may locally or remotely acquire the point cloud data collected for the preset scene and the scene image captured for the preset scene. The preset scene may be any type of scene, such as road, indoor, wilderness, and other scenes. The scene image may include various objects, such as vehicles, pedestrians, buildings, furniture, and the like. The point cloud data may be data collected by a device such as a lidar or a binocular stereo camera. The point cloud data may include 3D coordinate data in a point cloud coordinate system.

Step 202. Determine coordinates corresponding to the point cloud data in a camera coordinate system corresponding to the scene image.

In this embodiment, the electronic device may determine, in the camera coordinate system corresponding to the scene image, the coordinates corresponding to the point cloud data. The camera coordinate system is a 3D cartesian coordinate system with a lens of a camera that captures the scene image as an origin. The method for transforming the point cloud data from the point cloud coordinate system to the camera coordinate system is the prior art, and details are not described herein.

It should be noted that, there are a plurality of pieces of point cloud data herein, and correspondingly, there are also a plurality of sets of coordinates corresponding to the point cloud data.

Step 203. Determine, based on the coordinates, annotation spatial geometric information of a target pixel in the scene image corresponding to the point cloud data.

In this embodiment, the electronic device may determine, in the scene image based on the coordinates, the annotation spatial geometric information of the target pixel corresponding to the point cloud data. The target pixel is a point in the scene image, to which a point in a 3D space represented by the point cloud data is mapped. In an example, the electronic device may map the foregoing coordinates to the scene image based on pre-calibrated intrinsic parameters of the camera. The foregoing annotation spatial geometric information may be used to represent 3D spatial features of the target pixel.

In an example, the annotation spatial geometric information may be a ratio between height information and depth information that correspond to the pixel, that is, gamma=height/depth, or the annotation spatial geometric information may be also depth/height. The height information is used to represent a height from the point in the 3D space, corresponding to the pixel, to the ground. The depth information is used to represent a distance between the camera and the point, corresponding to the pixel, in the 3D space. The electronic device may calculate, according to the coordinates, a height and a depth of a point represented by the coordinates in the camera coordinate system, to obtain gamma through calculation.

Step 204. Train an initial model by using the scene image as an input of a preset initial model and the annotation spatial geometric information of the target pixel as an expected output of the initial model, to obtain a spatial geometric information estimation model.

In this embodiment, the electronic device may train the initial model by using the scene image as the input of the preset initial model and the annotation spatial geometric information of the target pixel as the expected output of the initial model, to obtain the spatial geometric information estimation model.

The initial model may be constructed from networks such as ResNet and VarGNet. The model may perform feature extraction and feature fusion on the input image (where feature fusion may be performed by using a UNet structure), and then predict spatial geometric information based on fused features.

The electronic device may train the initial model by using the scene image as the input and the annotation spatial geometric information for annotating the pixel in the input scene image as the expected output through a machine learning method. For the scene image input for each training, an actual output may be obtained. The actual output is spatial geometric information actually output by the initial model. Then, the electronic device may adjust parameters of the initial model based on the actual output and the expected output by using a gradient descent algorithm and a back propagation algorithm, to gradually decrease a difference between the actual output and the expected output, use a model obtained after each parameter adjustment as an initial model for next training, and end the training when a preset training end condition is met, so as to obtain the spatial geometric information estimation model through training.

It should be noted that, the preset training end condition herein may include, but is not limited to, at least one of the following items: a training duration exceeding a preset duration; a number of times of training exceeding a preset number of times; and a loss value obtained through calculation by using a preset loss function converging.

In the method provided in the foregoing embodiment of the present disclosure, point cloud data collected for a preset scene and a scene image captured for the preset scene are acquired, then coordinates corresponding to the point cloud data are determined in a camera coordinate system, then annotation spatial geometric information corresponding to the point cloud data is determined in the scene image based on the obtained coordinates, and finally, a spatial geometric information estimation model is obtained through training by using the scene image as an input and the annotation spatial geometric information as an expected output. This allows model training to be implemented by using a single frame image, and makes it easier to obtain a training sample. Furthermore, 3D space states of various objects included in the preset scene may be accurately represented by annotation spatial geometric information used during training, and thus it may be possible to effectively improve calculation accuracy of the spatial geometric information estimation model obtained through training.

Figure 3:
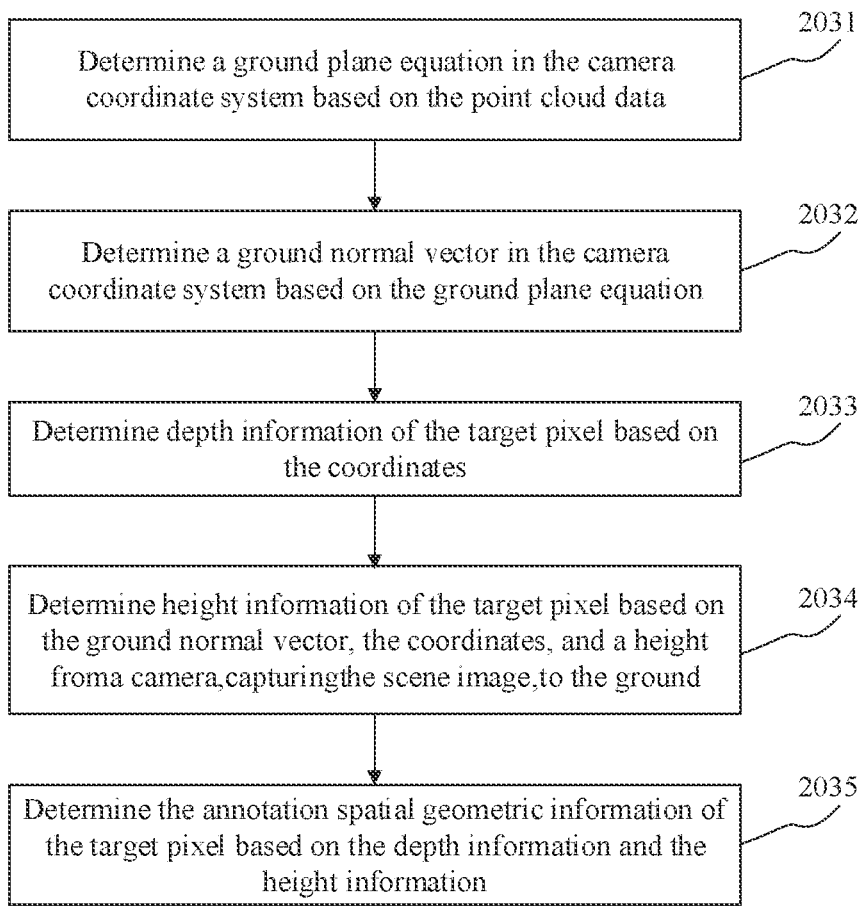
FIG. 3 is a schematic flowchart of a method for generating a spatial geometric information estimation model according to another exemplary embodiment of the present disclosure.

In some optional implementations, as shown in FIG. 3, step 203 may include the following substeps:

Step 2031. Determine a ground plane equation in the camera coordinate system based on the point cloud data.

The ground plane equation may be an equation representing the ground plane in the camera coordinate system. The electronic device may determine point cloud data representing the ground, from a large amount of point cloud data based on a prior point cloud segmentation algorithm, and fit a plane equation based on coordinates of the point cloud data representing the ground, to obtain the ground plane equation.

Step 2032. Determine a ground normal vector in the camera coordinate system based on the ground plane equation.

Typically, the ground plane equation may be expressed in various forms, such as a point-normal form or a normal form. When the ground plane equation is in the normal form, a normal vector may be determined directly from the ground plane equation as the ground normal vector.

Step 2033. Determine depth information of the target pixel based on the coordinates.

Specifically, a depth component of the coordinates corresponding to the point cloud data in the camera coordinate system (that is, a component in a direction of an optical axis of the camera) may be used as the depth information of the target pixel.

Step 2034. Determine height information of the target pixel based on the ground normal vector, the coordinates, and a height from a camera, capturing the scene image, to the ground.

The height from the camera to the ground may be determined based on a point-to-plane distance (that is, a distance between a location of the camera in the camera coordinate system (for example, the origin) and a plane represented by the ground plane equation).

Optionally, the height information may be determined by using the following point cloud transformation formula:

$$height = N * P + camH$$

where height represents the height information, N represents the ground normal vector, P represents the coordinates corresponding to the point cloud data in the camera coordinate system, and camH represents the height from the camera to the ground.

Step 2035. Determine the annotation spatial geometric information of the target pixel based on the depth information and the height information.

In an example, the annotation spatial geometric information may be determined by using the following formula:

$$gamma = height/depth$$

where gamma represents the annotation spatial geometric information, height represents the height information of the target pixel, and depth represents the depth information of the target pixel.

According to the method provided in the embodiment corresponding to FIG. 3, a ground plane equation in a camera coordinate system is determined, then a ground normal vector is determined according to the ground plane equation, and finally annotation spatial geometric information is determined according to the ground normal vector and other data, so that annotation spatial geometric information of a target pixel with respect to the ground plane may be accurately calculated, thereby helping train a model by using the annotation spatial geometric information of high accuracy, and improving calculation accuracy of a spatial geometric information estimation model.

In some optional implementations, based on the embodiment corresponding to FIG. 3, as shown in FIG. 4, step 204 may include the following substeps:

Step 2041. Input the scene image into the initial model to obtain predicted spatial geometric information corresponding to respective ones pixels included in the scene image.

The initial model may be constructed from networks such as ResNet and VarGNet. The model may perform feature extraction and feature fusion on the input image (where feature fusion may be performed by using a UNet structure), and then predict spatial geometric information based on fused features, to obtain the predicted spatial geometric information.

In this step, after the scene image is input into the initial model, the predicted spatial geometric information corresponding to the respective pixels included in the scene image is the output of the initial model.

Step 2042. Determine, by using a preset loss function, a loss value representing a difference between predicted spatial geometric information corresponding to the target pixel and the annotation spatial geometric information.

In an example, the loss value between the predicted spatial geometric information and the annotation spatial geometric information may be determined by using an L2 loss function.

Step 2043. Adjust parameters of the initial model based on the loss value.

Typically, during training, the parameters of the initial model are iteratively adjusted by minimizing the loss value, until a preset condition is met.

Step 2044. In response to determining that an initial model obtained after the parameter adjustment meets a preset condition, determine the initial model obtained after the parameter adjustment as the spatial geometric information estimation model obtained through training.

As an example, the preset condition may include, but is not limited to, at least one of the following items: a training duration exceeding preset duration; a number of times of training exceeding a preset number of times; and the loss value obtained through calculation by using the foregoing loss function converging.

According to the method provided in the embodiment corresponding to FIG. 4, because a quantity of points represented by the point cloud data is sparse in comparison to a quantity of pixels included in the scene image, during training by using the loss function, an amount of computation of the loss value may be reduced while prediction accuracy of the spatial geometric information estimation model after the training is ensured.

Further referring to FIG. 5, FIG. 5 is a schematic flowchart of a spatial geometric information estimating method according to an exemplary embodiment of the present disclosure. This embodiment is applicable to an electronic device (the terminal device 101 or the server 103 shown in FIG. 1). As shown in FIG. 5, the method includes the following steps:

Step 501. Acquire a scene image captured for a target scene.

In this embodiment, the electronic device may locally or remotely acquire the scene image captured for the target scene. The target scene may be any type of scene, for example, a road on which a vehicle is currently traveling.

Step 502. Input the scene image into a pre-trained spatial geometric information estimation model, to obtain spatial geometric information of a pixel included in the scene image in a camera coordinate system corresponding to the scene image.

In this embodiment, the electronic device may input the scene image into the pre-trained spatial geometric information estimation model, to obtain the spatial geometric information of the pixel included in the scene image in the camera coordinate system corresponding to the scene image. The spatial geometric information estimation model is obtained through training in advance according to the method described in any of the embodiments corresponding to FIG. 2 to FIG. 4.

Step 503. Determine, for the pixel included in the scene image, depth information and height information that correspond to the pixel in the camera coordinate system based on the spatial geometric information of the pixel. In other words, in this step, the depth information and the height information of the pixel in the camera coordinate system corresponding to the scene image are determined based on the spatial geometric information of the pixel included in the scene image in the camera coordinate system.

The camera coordinate system corresponding to the scene image refers to a 3D cartesian coordinate system with a lens of a camera that captures the scene image as the origin.

In this embodiment, for the pixel included in the scene image, the electronic device may determine the depth information and the height information of the pixel in the corresponding camera coordinate system based on the spatial geometric information of the pixel. The spatial geometric information may be used to represent 3D space features of the corresponding pixel. Depth information and height information of the corresponding pixel may be restored according to the spatial geometric information. It should be noted that, the electronic device may determine depth information and height information of each of the pixels included in the scene image, or may determine depth information and height information of some of pixels included in the scene image. For example, a target object (for example, a pedestrian, a vehicle, an obstacle or the like) may be obtained from the scene image by segmentation through a prior target detection algorithm, and then depth information and height information that correspond to respective ones of pixels included in the target object are determined based on the solution provided in this embodiment of the present disclosure.

According to the spatial geometric information estimating method provided in the embodiment corresponding to FIG. 5, during spatial geometric information estimation, by the input of only a single frame of image into the spatial geometric information estimation model, the spatial geometric information estimation model may output spatial geometric information corresponding to a pixel in the image, without analyzing a correlation among a plurality of frames of images, thereby improving efficiency of the spatial geometric information estimation. Meanwhile, estimated spatial geometric information is used to restore depth information and height information of various objects in the target scene, so that there is no need to perform an interframe pose operation on the objects, reducing demands for computing resources, in spite of a motion status of a detected object, thereby improving efficiency of acquiring 3D perception information in the target scene and extending applicable scenarios of determining 3D perception information.

In some optional implementations, as shown in FIG. 6, step 503 may include the following substeps:

Step 5031. Determine a ground plane equation for representing the ground in the camera coordinate system.

Specifically, the electronic device may acquire a section representing the ground from the scene image by segmentation through the prior target detection algorithm, and then fit a plane equation to obtain the ground plane equation.

Step 5032. Determine, based on the ground plane equation, a ground normal vector and a height of a camera with respect to the ground in the camera coordinate system. In this step, the camera in the camera coordinate system refers to the camera that captures the scene image. In other words, in this step, based on the ground plane equation, a normal vector of the ground plane is determined and the height of the camera that captures the scene image with respect to the ground is determined.

Typically, the ground plane equation may be expressed in a normal form, and a normal vector may be determined directly from the ground plane equation as the ground normal vector. The coordinate origin of the camera coordinate system is typically a position of the camera. Therefore, the height of the camera with respect to the ground may be determined according to the ground plane equation.

Step 5033. Acquire intrinsic parameters of the camera that captures the scene image.

The intrinsic parameters of the camera may be pre-calibrated, representing a correspondence between a point in the camera coordinate system and a point in an image coordinate system.

Step 5034. Determine the depth information of the pixel in the camera coordinate system corresponding to the scene image based on the ground normal vector, the intrinsic parameters, the height, the spatial geometric information of the pixel in the camera coordinate system, and coordinates of the pixel in the scene image.

Specifically, the spatial geometric information is set to gamma, and gamma=height/depth, where height represents the height information, and depth represents the depth information. The depth information may be obtained based on the following gamma transformation formula:

$$\text{depth} = \frac{camH}{\text{gamma} - N^T(K^{-1}p)}$$

where $N^T$ represents a transpose of a ground normal vector N in the camera coordinate system, camH represents the height of the camera with respect to the ground in the camera coordinate system, p represents 3D coordinates [u, v, 1] constructed from pixel coordinates [u, v] in the image coordinate system, and $K^{-1}$ represents the inverse of the intrinsic parameters of the camera, for transforming coordinates in the image coordinate system to the camera coordinate system.

Subsequently, the height information height may be obtained through calculation based on the spatial geometric information gamma and the depth information depth, by height=gamma*depth.

Step 5035. Determine the height information of the pixel in the camera coordinate system based on the spatial geometric information and the depth information of the pixel in the camera coordinate system.

According to the method provided in the embodiment corresponding to FIG. 6, a ground plane equation is determined, and height information and depth information of each of pixels in a scene image may be obtained based on the ground plane equation and spatial geometric information, thereby further improving efficiency and accuracy of determining depth information and height information by use of characteristic of high efficiency and accuracy for prediction of the spatial geometric information through a spatial geometric information estimation model.

Exemplary Apparatus

FIG. 7 is a schematic structural diagram of an apparatus for generating a spatial geometric information estimation model according to an exemplary embodiment of the present disclosure. This embodiment is applicable to an electronic device. As shown in FIG. 7, the apparatus for generating a spatial geometric information estimation model includes: a first acquirement module 701, configured to acquire point cloud data collected for a preset scene and a scene image captured for the preset scene; a first determination module 702, configured to determine coordinates corresponding to the point cloud data in a camera coordinate system corresponding to the scene image; a second determination module 703, configured to determine, based on the coordinates, annotation spatial geometric information of a target pixel corresponding to the point cloud data in the scene image; and a training module 704, configured to train the initial model by using the scene image as a preset input of an initial model and the annotation spatial geometric information of the target pixel as an expected output of the initial model, to obtain a spatial geometric information estimation model.

In this embodiment, the first acquirement module 701 may locally or remotely acquire the point cloud data collected for the preset scene and the scene image captured for the preset scene. The preset scene may be any type of scene, such as road, indoor, wilderness, and other scenes. The scene image may include various objects, such as vehicles, pedestrians, buildings, furniture, and the like. The point cloud data may be data collected by a device such as a lidar or a binocular stereo camera. The point cloud data may include 3D coordinate data in a point cloud coordinate system.

In this embodiment, the first determination module 702 may determine, in the camera coordinate system corresponding to the scene image, the coordinates corresponding to the point cloud data. The camera coordinate system is a 3D cartesian coordinate system with a lens of a camera that captures the scene image as the origin. The method for transforming the point cloud data from the point cloud coordinate system to the camera coordinate system is the prior art, and details are not described herein. It should be noted that, there are a plurality of pieces of point cloud data herein, and correspondingly, there are also a plurality of sets of coordinates corresponding to the point cloud data.

In this embodiment, the second determination module 703 may determine, in the scene image based on the coordinates, the annotation spatial geometric information of the target pixel corresponding to the point cloud data. The target pixel is a point in the scene image, to which a point in a 3D space represented by the point cloud data is mapped. In an example, the second determination module 703 may map the foregoing coordinates to the scene image based on pre-calibrated intrinsic parameters of the camera. The foregoing annotation spatial geometric information may be used to represent 3D spatial features of the target pixel.

In an example, the annotation spatial geometric information may be a ratio between height information and depth information that correspond to the pixel, that is, gamma=height/depth, or the annotation spatial geometric information may be also depth/height. The height information is used to represent a height of the point in the 3D space, corresponding to the pixel, to the ground. The depth information is used to represent a distance between the camera and the point corresponding to the pixel in the 3D space. The second determination module 703 may calculate, according to the coordinates, a height and a depth of a point represented by the coordinates in the camera coordinate system, to obtain gamma through calculation.

In this embodiment, the training module 704 may train an initial model by using the scene image as the input of a preset initial model and the annotation spatial geometric information of the target pixel as the expected output of the initial model, to obtain the spatial geometric information estimation model.

The initial model may be constructed from networks such as ResNet and VarGNet. The model may perform feature extraction and feature fusion on the input image (where feature fusion may be performed by using a UNet structure), and then predict spatial geometric information based on fused features.

The training module 704 may train the initial model by using the scene image as the input and the annotation spatial geometric information for annotating the pixel in the input scene image as the expected output through a machine learning method. For the scene image input for each training, an actual output may be obtained. The actual output is spatial geometric information actually output by the initial model. Then, the training module 704 may adjust parameters of the initial model based on the actual output and the expected output by using a gradient descent algorithm and a back propagation algorithm, use a model obtained after each parameter adjustment as an initial model for next training, and end the training when a preset training end condition is met, so as to obtain the spatial geometric information estimation model through training.

It should be noted that, the preset training end condition herein may include, but is not limited to, at least one of the following items: a training duration exceeding a preset duration; a number of times of training exceeding a preset number of times; and a loss value obtained through calculation by using a preset loss function converging.

Figure 8:
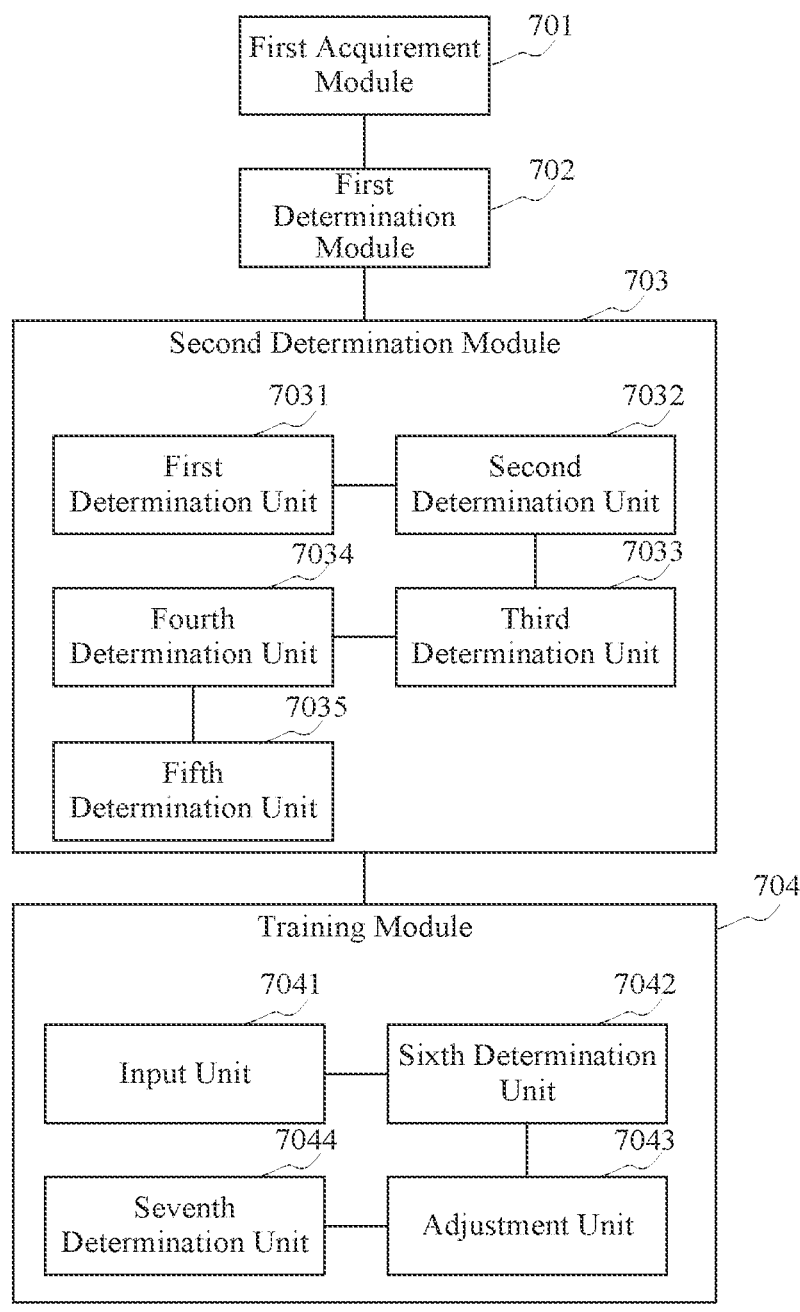
FIG. 8 is a schematic structural diagram of an apparatus for generating a spatial geometric information estimation model according to another exemplary embodiment of the present disclosure.

FIG. 8 is a schematic structural diagram of an apparatus for generating a spatial geometric information estimation model according to another exemplary embodiment of the present disclosure.

In some optional implementations, the second determination module 703 may include: a first determination unit 7031, configured to determine a ground plane equation in the camera coordinate system based on the point cloud data; a second determination unit 7032, configured to determine a ground normal vector in the camera coordinate system based on the ground plane equation; a third determination unit 7033, configured to determine depth information of the target pixel based on the coordinates; a fourth determination unit 7034, configured to determine height information of the a target pixel based on the ground normal vector, the coordinates, and a height from a camera capturing the scene image to the ground; and a fifth determination unit 7035, configured to determine the annotation spatial geometric information of the a target pixel based on the depth information and the height information.

In some optional implementations, the training module 704 may include: an input unit 7041, configured to input the scene image into the initial model to obtain predicted spatial geometric information corresponding to each of pixels included in the scene image; a sixth determination unit 7042, configured to determine, by using a preset loss function, a loss value representing a difference between predicted spatial geometric information corresponding to the target pixel and the annotation spatial geometric information; an adjustment unit 7043, configured to adjust parameters of the initial model based on the loss value; and a seventh determination unit 7044, configured to: in response to determining that an initial model obtained after the parameter adjustment meets a preset condition, determine the initial model obtained after the parameter adjustment as the spatial geometric information estimation model obtained through training.

According to the apparatus for generating a spatial geometric information estimation model provided in the foregoing embodiment of the present disclosure, point cloud data collected for a preset scene and a scene image captured for the preset scene are acquired, then coordinates corresponding to the point cloud data are determined in a camera coordinate system, then annotation spatial geometric information of a target pixel corresponding to the point cloud data is determined in the scene image based on the obtained coordinates, and finally, a spatial geometric information estimation model is obtained through training by using the scene image as an input and the annotation spatial geometric information as an expected output. This allows model training to be implemented by using a single frame of image, and makes it easier to obtain a training sample. Furthermore, 3D space states of various objects included in the preset scene may be accurately represented by annotation spatial geometric information used during training, and thus it may be possible to effectively improve calculation accuracy of the spatial geometric information estimation model obtained through training.

Figure 9:
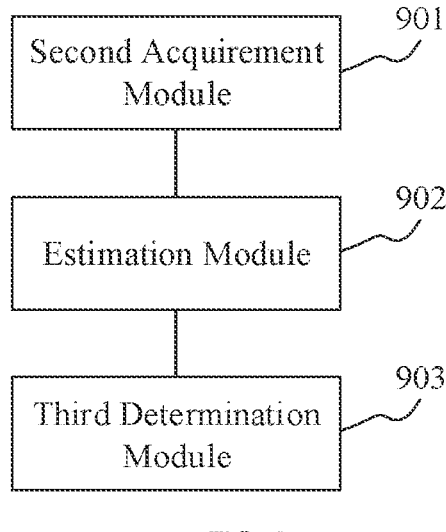
FIG. 9 is a schematic structural diagram of a spatial geometric information estimating apparatus according to an exemplary embodiment of the present disclosure.

FIG. 9 is a schematic structural diagram of a spatial geometric information estimating apparatus according to an exemplary embodiment of the present disclosure. This embodiment is applicable to an electronic device. As shown in FIG. 9, the spatial geometric information estimating apparatus includes: a second acquirement module 901, configured to acquire a scene image captured for a target scene; an estimation module 902, configured to input the scene image into a pre-trained spatial geometric information estimation model, to obtain spatial geometric information of a pixel included in the scene image in a camera coordinate system corresponding to the scene image; and a third determination module 903, configured to: determining, for the pixel included in the scene image, depth information and height information of the pixel in the camera coordinate system corresponding to the scene image based on the spatial geometric information of the pixel in the camera coordinate system.

In this embodiment, the second acquirement module 901 may locally or remotely acquire the scene image captured for the target scene. The target scene may be any type of scene, for example, a road on which a vehicle is currently traveling.

In this embodiment, the estimation module 902 may input the scene image into the pre-trained spatial geometric information estimation model, to obtain the spatial geometric information of the pixel included in the scene image in the camera coordinate system corresponding to the scene image.

The spatial geometric information estimation model is obtained through training in advance according to the method described in any of the embodiments corresponding to FIG. 2 to FIG. 4.

In this embodiment, the third determination module 903 may determine the depth information and the height information corresponding to the pixel in the camera coordinate system corresponding to the scene image based on the spatial geometric information of the pixel in the camera coordinate system. The spatial geometric information may be used to represent 3D space features of the corresponding pixel. Depth information and height information of the corresponding pixel may be restored according to the spatial geometric information.

Figure 10:
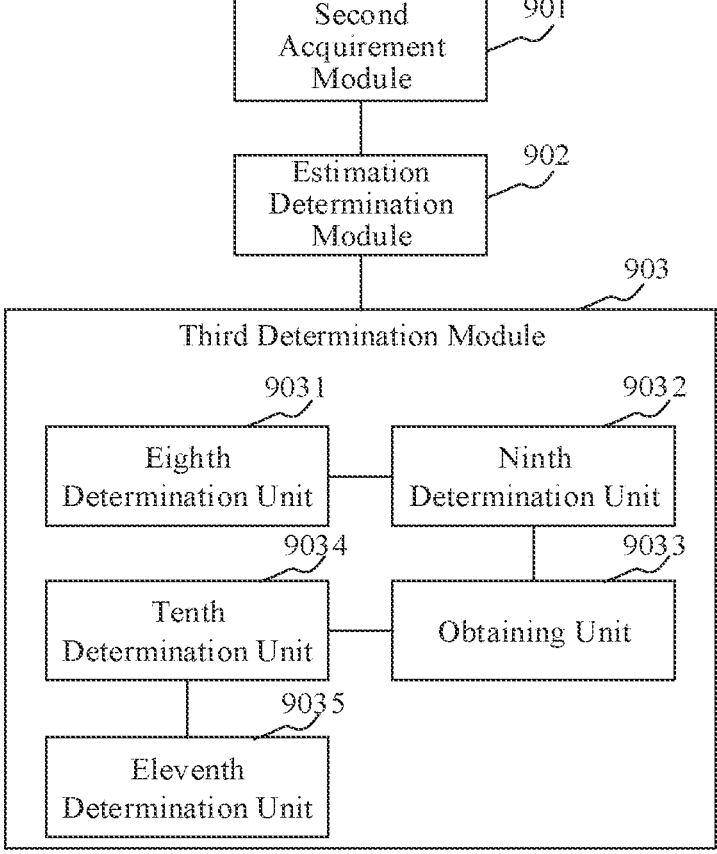
FIG. 10 is a schematic structural diagram of a spatial geometric information estimating apparatus according to another exemplary embodiment of the present disclosure.

FIG. 10 is a schematic structural diagram of a spatial geometric information estimating apparatus according to another exemplary embodiment of the present disclosure.

In some optional implementations, the third determination module 903 may include: an eighth determination unit 9031, configured to determine a ground plane equation for representing the ground in the camera coordinate system; a ninth determination unit 9032, configured to determining, based on the ground plane equation, a ground normal vector and a height of a camera with respect to the ground in the camera coordinate system; an acquirement unit 9033, configured to acquire intrinsic parameters of the camera that captures the scene image; a tenth determination unit 9034, configured to determine the depth information of the pixel in the camera coordinate system corresponding to the scene image based on the ground normal vector, the intrinsic parameters, the height, the spatial geometric information of the pixel in the camera coordinate system, and coordinates of the pixel in the scene image; and an eleventh determination unit 9035, configured to determine the height information of the pixel in the camera coordinate system corresponding to the scene image based on the spatial geometric information and the depth information of the pixel in the camera coordinate system.

According to the spatial geometric information estimating apparatus provided in the foregoing embodiment of the present disclosure, during spatial geometric information estimation, by the input of only a single frame of image, spatial geometric information corresponding to a pixel in the image may be output, without analyzing a correlation among a plurality of frames of images, thereby improving efficiency of the spatial geometric information estimation. Meanwhile, estimated spatial geometric information is used to restore depth information and height information of various objects in the target scene, so that there is no need to perform an interframe pose operation on the objects, reducing demands for computing resources, in spite of a motion status of a detected object, thereby improving efficiency of acquiring 3D perception information in the target scene and extending applicable scenarios of determining 3D perception information.

Exemplary Electronic Device

The electronic device according to the embodiments of the present disclosure is described below with reference to FIG. 11. The electronic device may be either or both of the terminal device 101 and the server 103 shown in FIG. 1, or a standalone device independent thereof. The standalone device may communicate with the terminal device 101 and the server 103 to receive collected input signals from them.

Figure 11:
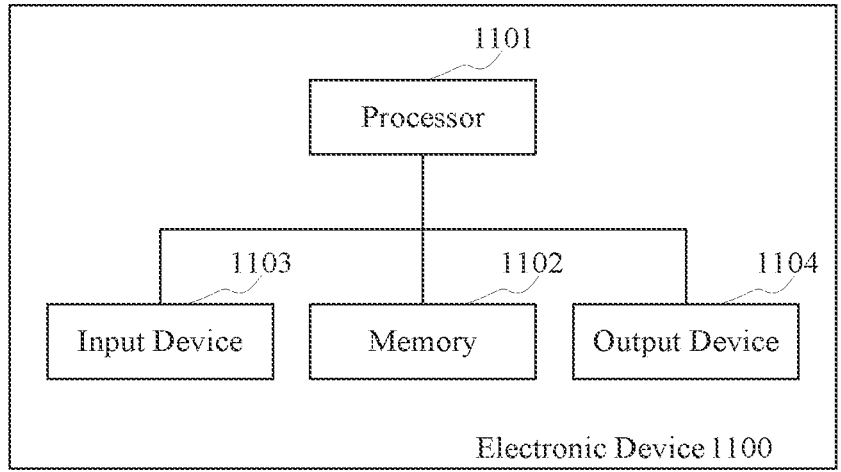
FIG. 11 is a structural diagram of an electronic device according to an exemplary embodiment of the present disclosure.

FIG. 11 illustrates a block diagram of an electronic device according to an embodiment of the present disclosure.

As shown in FIG. 11, the electronic device 1100 includes one or more processors 1101 and a memory 1102.

The processor 1101 may be a central processing unit (CPU) or another form of processing unit having a data processing capability and/or an instruction execution capability, and may control another component in the electronic device 1100 to perform a desired function.

The memory 1102 may include one or more computer program products. The computer program product may include various forms of computer-readable storage mediums, such as a volatile memory and/or a non-volatile memory. The volatile memory may include, for example, a random access memory (random access memory, RAM) and/or a cache. The non-volatile memory may include, for example, a read-only memory (ROM), a hard disk, or a flash memory. The computer-readable storage medium may store one or more computer program instructions. The processor 1101 may run the program instructions, to implement the method for generating a spatial geometric information estimation model, the spatial geometric information estimating method, and/or other desired functions in the foregoing embodiments of the present disclosure. The computer-readable storage medium may further store various contents such as scene images.

In an example, the electronic device 1100 may further include: an input device 1103 and an output device 1104. The components are interconnected through a bus system and/or other forms of connection mechanisms (not shown).

For example, when the electronic device is the terminal device 101 or the server 103, the input device 1103 may be a device such as a camera, a mouse, or a keyboard, for inputting a scene image, various commands required for program execution, and the like. When the electronic device is a standalone device, the input device 1103 may be a communication network connector, for receiving the scene image input from the terminal device 101 and the server 103.

The output device 1104 may output various information, including determined spatial geometric information, to the outside. The output device 1104 may include, for example, a display, a speaker, a printer, a communication network, and a remote output device connected to the communication network.

Certainly, for simplicity, only some components in the electronic device 1100 that are related to the present disclosure are shown in FIG. 11, and components such as a bus and an input/output interface are omitted. Besides, the electronic device 1100 may further include any other appropriate components depending on specific applications.

Exemplary Computer Program Product and Computer-Readable Storage Medium

In addition to the foregoing methods and devices, an embodiment of the present disclosure may be a computer program product, including computer program instructions. The computer program instructions, when executed by a processor, cause the processor to perform the steps in the method for generating a spatial geometric information estimation model or the spatial geometric information estimating method according to the embodiments of the present disclosure described in the foregoing "exemplary method" part of this specification.

The computer program product may be used to write, in any combination of one or more programming languages, program code for performing an operation in this embodiment of the present disclosure. The programming languages include object-oriented programming languages, such as Java and C++, and conventional procedural programming languages, such as "C" language or similar programming languages. The program code may be executed entirely on a user computing device, partly on user equipment, as a standalone software package, partly on a user computing device and partly on a remote computing device, or entirely on a remote computing device or a server.

In addition, this embodiment of the present disclosure may alternatively be a computer-readable storage medium, storing computer program instructions. The computer program instructions, when executed by a processor, cause the processor to perform the steps in the method for generating a spatial geometric information estimation model or the spatial geometric information estimating method according to the embodiments of the present disclosure described in the foregoing "exemplary method" part of this specification.

The computer-readable storage medium may be any combination of one or more readable mediums. The readable medium may be a readable signal medium or a readable storage medium. The readable storage medium may include, for example, but is not limited to electrical, magnetic, optical, electromagnetic, infrared, or semiconductor systems, apparatuses, or devices, or any combination thereof. More specific examples (non-exhaustive list) of the readable storage medium include: an electrical connection with one or more conducting wires, a portable disk, a hard disk, a RAM, a ROM, an erasable programmable read-only memory (EPROM or flash memory), an optical fiber, a portable compact disc read-only memory (CD-ROM), an optical memory device, a magnetic memory device, or any suitable combination thereof.

The basic principles of the present disclosure have been described above with reference to specific embodiments. However, it should be noted that the benefits, advantages, effects, and the like mentioned in the present disclosure are only examples rather than limitations, and these benefits, advantages, effects, and the like should not be considered to be necessary for the embodiments of the present disclosure. Moreover, the specific details disclosed above are for exemplary purposes and ease of understanding only, but not for limitation, and the above details do not limit the present disclosure to be implemented by using the specific details described above.

The embodiments in this specification are described in a progressive manner, each embodiment focuses on differences from other embodiments, and the same or similar parts between the embodiments may be referred to each other. The system embodiment is described in a relatively simple way as it basically corresponds to the method embodiment. For related parts, refer to the partial description of the method embodiment.

The block diagrams of the means, apparatus, devices, and systems involved in the present disclosure are provided as illustrative examples only, and it is not intended to require or imply that they should be connected, arranged, or configured in the manner illustrated in the block diagrams. As those skilled in the art will appreciate, these means, apparatuses, devices, and systems may be connected, arranged, or configured in any manner. Terms such as "including", "containing", and "having" are open-ended terms, refer to and may be used interchangeably with "including but not limited to". The terms "or" and "and" as used herein refer to and may be used interchangeably with the term "and/or", unless otherwise clearly stated in the context. The term "such as" as used herein refers to and may be used interchangeably with the term "such as, but not limited to".

The methods and apparatuses of the present disclosure may be implemented in many ways. For example, the methods and apparatuses of the present disclosure may be implemented by software, hardware, firmware, or any combination of software, hardware, and firmware. The above sequence of steps for use in the method is for illustrative purposes only. The steps of the method of the present disclosure are not limited to the sequence specifically described above, unless otherwise specifically stated. In addition, in some embodiments, the present disclosure may alternatively be implemented as programs recorded in a recording medium, and the programs include machine-readable instructions for implementing the methods according to the present disclosure. Therefore, the present disclosure also covers a recording medium storing programs for performing the methods according to the present disclosure.

It should also be noted that, in the apparatuses, devices, and methods of the present disclosure, each component or each step may be decomposed and/or recombined. These decompositions and/or recombinations should be considered equivalent solutions of the present disclosure.

The above description of the disclosed aspects is provided to enable those skilled in the art to make or use the present disclosure. Various modifications to these aspects will be readily apparent to those skilled in the art, and the generic principles defined herein may be applied to other aspects without departing from the scope of the present disclosure. Therefore, the present disclosure is not intended to be limited to the aspects shown herein, but rather to the widest scope consistent with the principles and novel features disclosed herein.

The above description has been given for the purposes of illustration and description. In addition, this description is not intended to limit the embodiments of the present disclosure to the forms disclosed herein. Although a plurality of exemplary aspects and embodiments have been discussed above, those skilled in the art will figure out certain variations, modifications, changes, additions, and subcombinations thereof.

What is claimed is:

1. A method for generating a spatial geometric information estimation model, including:

acquiring point cloud data collected for a preset scene and a scene image captured for the preset scene;

determining coordinates corresponding to the point cloud data in a camera coordinate system corresponding to the scene image;

determining, based on the coordinates, annotation spatial geometric information of a target pixel in the scene image corresponding to the point cloud data, wherein the annotation spatial geometric information is a ratio between height information and depth information that correspond to the target pixel or a ratio between the depth information and the height information; and training an initial model by using the scene image as an input of the preset initial model and the annotation spatial geometric information of the target pixel as an expected output of the initial model to obtain the spatial geometric information estimation model.

2. The method according to claim 1, wherein the determining, based on the coordinates, annotation spatial geometric information of a target pixel in the scene image corresponding to the point cloud data includes:

determining a ground plane equation in the camera coordinate system based on the point cloud data;

determining a ground normal vector in the camera coordinate system based on the ground plane equation;

determining depth information of the target pixel based on the coordinates;

determining height information of the target pixel based on the ground normal vector, the coordinates, and a height from a camera capturing the scene image to the ground; and determining the annotation spatial geometric information of the target pixel based on the depth information and the height information.

3. The method according to claim 2, wherein the training the initial model by using the scene image as the input of the preset initial model and the annotation spatial geometric information of the target pixel as an expected output of the initial model to obtain the spatial geometric information estimation model includes:

inputting the scene image into the initial model to obtain predicted spatial geometric information corresponding to each of pixels included in the scene image;

determining, by using a preset loss function, a loss value representing a difference between the predicted spatial geometric information corresponding to the target pixel and the annotation spatial geometric information;

adjusting parameters of the initial model based on the loss value; and in response to determining that the initial model obtained after the parameter adjustment meets a preset condition, determining the initial model obtained after the parameter adjustment as the spatial geometric information estimation model obtained through training.

4. A non-transitory computer-readable storage medium, wherein the storage medium stores a computer program, and the computer program is used for performing a method for generating a spatial geometric information estimation model, wherein the method for generating a spatial geometric information estimation model, including:

acquiring point cloud data collected for a preset scene and a scene image captured for the preset scene;

determining coordinates corresponding to the point cloud data in a camera coordinate system corresponding to the scene image;

determining, based on the coordinates, annotation spatial geometric information of a target pixel in the scene image corresponding to the point cloud data, wherein the annotation spatial geometric information is a ratio between height information and depth information that correspond to the target pixel or a ratio between the depth information and the height information; and training an initial model by using the scene image as an input of the initial model and the annotation spatial geometric information of the target pixel as an expected output of the initial model to obtain the spatial geometric information estimation model.

5. An electronic device, the electronic device including:

a processor; and a memory, configured to store instructions executable by the processor, wherein the processor is configured to read the executable instructions from the memory and execute the instructions to implement a method for generating a spatial geometric information estimation model, wherein the method for generating a spatial geometric information estimation model, including:

acquiring point cloud data collected for a preset scene and a scene image captured for the preset scene;

determining coordinates corresponding to the point cloud data in a camera coordinate system corresponding to the scene image;

determining, based on the coordinates, annotation spatial geometric information of a target pixel in the scene image corresponding to the point cloud data, wherein the annotation spatial geometric information is a ratio between height information and depth information that correspond to the target pixel or a ratio between the depth information and the height information; and training an initial model by using the scene image as an input of the initial model and the annotation spatial geometric information of the target pixel as an expected output of the initial model to obtain the spatial geometric information estimation model.

6. The method according to claim 3, wherein the inputting the scene image into the initial model to obtain predicted spatial geometric information corresponding to each of pixels included in the scene image includes:

performing feature extraction and feature fusion, by the initial model, on the inputted scene image and then predicting the spatial geometric information based on fused features, to obtain the predicted spatial geometric information.

7. The method according to claim 3, wherein the preset condition includes at least one of a training duration exceeding a preset duration, a number of times of training exceeding a preset number of times, and the loss value obtained through calculation by using the preset loss function converging.

8. The non-transitory computer-readable storage medium according to claim 4, wherein the determining, based on the coordinates, annotation spatial geometric information of a target pixel in the scene image corresponding to the point cloud data includes:

determining a ground plane equation in the camera coordinate system based on the point cloud data;

determining a ground normal vector in the camera coordinate system based on the ground plane equation;

determining depth information of the target pixel based on the coordinates;

determining height information of the target pixel based on the ground normal vector, the coordinates, and a height from a camera capturing the scene image to the ground; and determining the annotation spatial geometric information of the target pixel based on the depth information and the height information.

9. The non-transitory computer-readable storage medium according to claim 8, wherein the training the initial model by using the scene image as the input of the preset initial model and the annotation spatial geometric information of the target pixel as an expected output of the initial model to obtain a spatial geometric information estimation model includes:

inputting the scene image into the initial model to obtain predicted spatial geometric information corresponding to each of pixels included in the scene image;

determining, by using a preset loss function, a loss value representing a difference between the predicted spatial geometric information corresponding to the target pixel and the annotation spatial geometric information;

adjusting parameters of the initial model based on the loss value; and in response to determining that the initial model obtained after the parameter adjustment meets a preset condition, determining the initial model obtained after the parameter adjustment as the spatial geometric information estimation model obtained through training.

10. The non-transitory computer-readable storage medium according to claim 9, wherein the inputting the scene image into the initial model to obtain predicted spatial geometric information corresponding to each of pixels included in the scene image includes:

performing feature extraction and feature fusion, by the initial model, on the inputted scene image and then predicting the spatial geometric information based on fused features, to obtain the predicted spatial geometric information.

11. The non-transitory computer-readable storage medium according to claim 9, wherein the preset condition includes at least one of a training duration exceeding a preset duration, a number of times of training exceeding a preset number of times, and the loss value obtained through calculation by using the preset loss function converging.

12. The electronic device according to claim 5, wherein the determining, based on the coordinates, annotation spatial geometric information of a target pixel in the scene image corresponding to the point cloud data includes:

determining a ground plane equation in the camera coordinate system based on the point cloud data;

determining a ground normal vector in the camera coordinate system based on the ground plane equation;

determining depth information of the target pixel based on the coordinates;

determining height information of the target pixel based on the ground normal vector, the coordinates, and a height from a camera capturing the scene image to the ground; and determining the annotation spatial geometric information of the target pixel based on the depth information and the height information.

13. The electronic device according to claim 12, wherein the training the initial model by using the scene image as the input of the preset initial model and the annotation spatial geometric information of the target pixel as an expected output of the initial model to obtain a spatial geometric information estimation model includes:

inputting the scene image into the initial model to obtain predicted spatial geometric information corresponding to each of pixels included in the scene image;

determining, by using a preset loss function, a loss value representing a difference between the predicted spatial geometric information corresponding to the target pixel and the annotation spatial geometric information;

adjusting parameters of the initial model based on the loss value; and in response to determining that the initial model obtained after the parameter adjustment meets a preset condition, determining the initial model obtained after the parameter adjustment as the spatial geometric information estimation model obtained through training.

14. The electronic device according to claim 13, wherein the inputting the scene image into the initial model to obtain predicted spatial geometric information corresponding to each of pixels included in the scene image includes:

performing feature extraction and feature fusion, by the initial model, on the inputted scene image and then predicting the spatial geometric information based on fused features, to obtain the predicted spatial geometric information.

\* \* \* \* \*